US010430596B2

(12) United States Patent
Sheng

(10) Patent No.: US 10,430,596 B2
(45) Date of Patent: Oct. 1, 2019

(54) INFORMATION PROCESSING METHOD, TERMINAL AND NONVOLATILE MACHINE-READABLE MEDIUM

(71) Applicant: YULONG COMPUTER TELECOMMUNICATION SCIENTIFIC (SHENZHEN) CO., LTD., Shenzhen, Guangdong (CN)

(72) Inventor: Jingen Sheng, Guangdong (CN)

(73) Assignee: YULONG COMPUTER TELECOMMUNICATION SCIENTIFIC (SHENZHEN) CO., LTD., Guangdong (CN)

( * ) Notice: Subject to any disclaimer, the term of this patent is extended or adjusted under 35 U.S.C. 154(b) by 259 days.

(21) Appl. No.: 15/468,587

(22) Filed: Mar. 24, 2017

(65) Prior Publication Data
US 2017/0200016 A1 Jul. 13, 2017

Related U.S. Application Data

(63) Continuation-in-part of application No. PCT/CN2015/085888, filed on Jul. 31, 2015.

(30) Foreign Application Priority Data

Sep. 29, 2014 (CN) .......................... 2014 1 0513873

(51) Int. Cl.
*G06F 21/62* (2013.01)
*G06F 21/31* (2013.01)
*G06F 21/60* (2013.01)
(52) U.S. Cl.
CPC .............. *G06F 21/62* (2013.01); *G06F 21/31* (2013.01); *G06F 21/602* (2013.01)

(58) Field of Classification Search
CPC ...................................................... G06F 21/62
See application file for complete search history.

(56) References Cited

U.S. PATENT DOCUMENTS 8,146,093 B2 * 3/2012 Li .......................... G06F 9/441
712/228
8,266,400 B2 * 9/2012 Uchikado ........... G06F 11/2064
709/213

(Continued)

FOREIGN PATENT DOCUMENTS

CN 1622099 A 6/2005
CN 1728115 A 2/2006
(Continued)

OTHER PUBLICATIONS

International Search Report dated Oct. 28, 2015 issued in PCT/CN2015/085888.

(Continued)

*Primary Examiner* — Ali Shayanfar
(74) *Attorney, Agent, or Firm* — Scully, Scott, Murphy & Presser, P.C.

(57) ABSTRACT

The invention provides an information processing method. The information processing method is applied to a terminal that comprises a plurality of operating systems. The information processing method comprises: upon receiving an instruction of copying data information in an arbitrary operating system to a specified operating system among the plurality of operating systems, acquiring a target entering key of the specified operating system; and after copying the data information to the specified operating system, encrypting the data information in the arbitrary operating system by using the target entering key of the specified operating system, or not displaying the data information in the arbitrary operating system again. The technical solution guarantees that data are not lost and also guarantees that data are (Continued)

not easy to divulge. The invention also provides a terminal and a nonvolatile machine-readable medium.

20 Claims, 3 Drawing Sheets

(56) References Cited

U.S. PATENT DOCUMENTS

| | | | | |
|---|---|---|---|---|
| 8,285,987 | B1* | 10/2012 | Kimball | G06F 21/14 |
| | | | | 713/164 |
| 8,943,569 | B1* | 1/2015 | Luckett, Jr. | G09G 5/377 |
| | | | | 726/7 |
| 8,966,021 | B1* | 2/2015 | Allen | G06F 9/45533 |
| | | | | 709/220 |
| 8,990,793 | B1* | 3/2015 | Fong-Jones | G06F 8/61 |
| | | | | 717/168 |
| 9,146,769 | B1* | 9/2015 | Shankar | G06F 9/45558 |
| 2005/0144448 | A1 | 6/2005 | England et al. | |
| 2005/0182922 | A1* | 8/2005 | Guo | G06F 9/441 |
| | | | | 713/1 |
| 2007/0043680 | A1* | 2/2007 | Fox | G06F 21/10 |
| | | | | 705/59 |
| 2007/0124302 | A1 | 5/2007 | Korn et al. | |
| 2009/0158299 | A1* | 6/2009 | Carter | G06F 9/4843 |
| | | | | 719/319 |
| 2011/0276806 | A1* | 11/2011 | Casper | G06F 21/602 |
| | | | | 713/189 |
| 2012/0131681 | A1* | 5/2012 | Layson | G06F 21/125 |
| | | | | 726/28 |
| 2012/0331307 | A1* | 12/2012 | Fernandez Gutierrez | |
| | | | | G06F 21/72 |
| | | | | 713/190 |
| 2013/0117563 | A1* | 5/2013 | Grabelkovsky | G06F 21/6218 |
| | | | | 713/165 |
| 2014/0068265 | A1* | 3/2014 | Irwin | H04L 63/123 |
| | | | | 713/170 |
| 2014/0205099 | A1* | 7/2014 | Christodorescu | H04L 9/0819 |
| | | | | 380/278 |

FOREIGN PATENT DOCUMENTS

| | | |
|---|---|---|
| CN | 101231622 A | 7/2008 |
| CN | 101243469 A | 8/2008 |
| CN | 102567323 A | 7/2012 |
| CN | 103413102 A | 11/2013 |
| CN | 103605559 A | 2/2014 |
| CN | 103713915 A | 4/2014 |
| CN | 104298931 A | 1/2015 |

OTHER PUBLICATIONS

Extended European Search Report dated May 11, 2018 received in European Patent Application No. EP 15846016.2.

* cited by examiner

INFORMATION PROCESSING METHOD, TERMINAL AND NONVOLATILE MACHINE-READABLE MEDIUM

The present application claims the priority of the Chinese Patent Application No. 201410513873.2, submitted to the China Patent Bureau, filed on Sep. 29, 2014 and entitled "INFORMATION PROCESSING METHOD AND INFORMATION PROCESSING DEVICE", of which all the disclosure hereby is incorporated herein by reference.

TECHNICAL FIELD

The present disclosure relates to the technical field of terminals, and specifically, relates to an information processing method, a terminal and a nonvolatile machine-readable medium.

BACKGROUND

For a terminal with dual-system, if one system is defined as a security system, while the other system as a common system, data need to be moved from the common system to the security system to guarantee important information not to be stolen. Furthermore, the data should be guaranteed not to be lost, and exporting the data moved to the security system has some problems, so many users copy data to the security system while backup the data in the common system. However, when a user copies contacts from the common system to the security system, it indicates that these contacts are very important, so the information of these contacts needs to be specially protected. In addition, the data entering the security system cannot be exported in any form in order to guarantee absolute security. Thus, the user copying the data to the security system instead of moving the data to the security system mainly concerns that the data are lost when the terminal is damaged, but the data stored in the common system can be exported in various forms to avoid loss.

However, in the existing terminal, the data is displayed in both copying and copied positions after the data are copied, which is obviously unbeneficial to the security of the data, and others can easily see the names and numbers of the contacts in the security system.

Therefore, a new technical solution is needed to guarantee the security of the data copied from the common system to the security system.

SUMMARY

The present disclosure provides a new technical solution just based on the above problems, which can guarantee the security of data copied from a common system to a security system.

In view of this, the present disclosure provides an information processing method, applied to a terminal that includes a plurality of operating systems, including: acquiring a target entering key of a specified operating system upon receiving an instruction of copying data information in an arbitrary operating system to the specified operating system among the plurality of operating systems; and after copying the data information to the specified operating system, encrypting the data information in the arbitrary operating system by using the target entering key of the specified operating system, or not displaying the data information in the arbitrary operating system again.

In the technical solution, after the data information is copied from the arbitrary operating system to the specified operating system, the data information in the arbitrary operating system can be encrypted by adopting the entering key of the specified operating system, or the data information is not displayed in the arbitrary operating system, that is, the data information is stored in the arbitrary operating system, but is concealed. The arbitrary operating system may be a common operating system while the specified operating system be a security operating system, thus, after the data being copied from the common operating system to the security operating system, the data information is encrypted by using the entering key of the security operating system, or is stored in the common system but not displayed again, thereby guaranteeing that the data can be exported from the common operating system when the terminal is damaged to avoid data loss, and also guaranteeing that the data stored in the security operating system are not easy to divulge.

The data information includes but is not limited to contact information, notebook information, call records.

In the above technical solution, preferably, the method further includes: prompting a user of the terminal to input an entering key of the specified operating system after acquiring the target entering key of the specified operating system; judging whether the received entering key input by the user is matched with the target entering key or not; when judging that the entering key input by the user is matched with the target entering key, permitting copying the data information to the specified operating system, otherwise, forbidding copying the data information to the specified operating system.

In the technical solution, after receiving the copying command and acquiring the entering key of the specified operating system, the terminal prompts the user to input the entering key of the specified operating system and judges whether the key input by the user is correct or not. The data information is copied to the specified operating system when the user inputs the correct key, and the copying operation is forbidden when the key input by the user is incorrect. Thus, only the user who knows the entering key of the specified operating system can carry out the copying operation, thereby guaranteeing the security in the specified operating system and preventing unsecure data from maliciously disrupting the specified operating system.

In the above technical solution, preferably, encrypting the data information in the arbitrary operating system by using the target entering key of the specified operating system specifically includes: generating a security packet in the arbitrary operating system; moving the data information in the arbitrary operating system to the security packet; and encrypting the security packet by using the target entering key.

In the technical solution, after the data information in the arbitrary operating system is copied to the specified operating system, a security packet is generated in the arbitrary operating system, the data information copied just is put into the security packet, and the security packet is encrypted by using the security key of the specified operating system, so that the data information copied to the specified operating system is not easily viewed by others, and the data security and the user privacy are guaranteed.

In the above technical solution, preferably, the method further includes: prompting the user to input an entering key of the security packet upon receiving a command of entering the security packet; judging whether the received entering key input by the user is matched with the target entering key or not; when judging that the entering key input by the user is matched with the target entering key, permitting entering the security packet, otherwise, forbidding entering the security packet.

In the technical solution, if the user wants to view the data information in the security packet, the user must input the same entering key as the specified operating system; as long as the user inputs the correct entering key, the user is permitted to view the data in the security packet, thereby guaranteeing the data security and the user privacy.

In the above technical solution, preferably, the specified operating system is an operating system with the highest security level among the plurality of operating systems.

In the technical solution, the specified operating system includes but is not limited to the operating system with the highest security level, namely a security system.

According to another aspect of the present disclosure, further provided is an information processing device, applied to a terminal that includes a plurality of operating systems, including: an acquisition unit, configured to acquire a target entering key of a specified operating system upon receiving an instruction of copying data information in an arbitrary operating system to the specified operating system among the plurality of operating systems; and a processing unit, configured to, after copying the data information to the specified operating system, encrypt the data information in the arbitrary operating system by using the target entering key of the specified operating system, or not display the data information in the arbitrary operating system again.

In the technical solution, after the data information is copied from the arbitrary operating system to the specified operating system, the data information in the arbitrary operating system can be encrypted by adopting the entering key of the specified operating system, or the data information is not displayed in the arbitrary operating system, that is, the data information is stored in the arbitrary operating system, but is concealed. The arbitrary operating system may be a common operating system, while the specified operating system be a security operating system. Thus, after the data are copied from the common operating system to the security operating system, the data information is encrypted by using the entering key of the security operating system, or is stored in the common system but not displayed again, thereby guaranteeing that the data can be exported from the common operating system when the terminal is damaged to avoid data loss, and also guaranteeing that the data stored in the security operating system are not easy to divulge.

In the above technical solution, preferably, the device further includes: a prompt unit, configured to, prompt a user of the terminal to input an entering key of the specified operating system after acquiring the target entering key of the specified operating system; a judgment unit, configured to judge whether the received entering key input by the user is matched with the target entering key or not; and a copying unit, configured to, when judging that the entering key input by the user is matched with the target entering key, permit copying the data information to the specified operating system, otherwise, forbid copying the data information to the specified operating system.

In the technical solution, after receiving the copying command and acquiring the entering key of the specified operating system, the terminal prompts the user to input the entering key of the specified operating system and judges whether the key input by the user is correct or not, the data information is copied to the specified operating system when the user inputs the correct key, and the copying operation is forbidden when the key input by the user is incorrect, and then only the user who knows the entering key of the specified operating system can carry out the copying operation, thereby guaranteeing the security in the specified operating system and preventing unsecure data from maliciously disrupting the specified operating system.

In the above technical solution, preferably, the processing unit includes: a generation unit, configured to generate a security packet in the arbitrary operating system; a movement unit, configured to move the data information in the arbitrary operating system to the security packet; and an encryption unit, configured to encrypt the security packet by using the target entering key.

In the technical solution, after the data information in the arbitrary operating system is copied to the specified operating system, a security packet is generated in the arbitrary operating system, the data information copied just is put into the security packet, and the security packet is encrypted by using the security key of the specified operating system, so that the data information copied to the specified operating system is not easily viewed by others, and the data security and the user privacy are guaranteed.

In the above technical solution, preferably, the prompt unit is further configured to: prompt the user to input an entering key of the security packet upon receiving a command of entering the security packet; the judgment unit is further configured to: judge whether the received entering key input by the user is matched with the target entering key or not; the processing unit is further configured to: when judging that the entering key input by the user is matched with the target entering key, permit entering the security packet, otherwise, forbid entering the security packet.

In the technical solution, if the user wants to view the data information in the security packet, the user must input the same entering key as the specified operating system; as long as the user inputs the correct entering key, the user is permitted to view the data in the security packet, thereby guaranteeing the data security and the user privacy.

In the above technical solution, preferably, the specified operating system is an operating system with the highest security level among the plurality of operating systems.

In the technical solution, the specified operating system includes but is not limited to the operating system with the highest security level, namely a security system.

According to another aspect of the present disclosure, further provided is a terminal comprising a plurality of operating systems, the terminal comprises: an input device, an output device, a processor and a memory, wherein by invoking operation instructions stored in the memory, the processor is used for executing the following operations: upon receiving an instruction of copying data information in an arbitrary operating system to the specified operating system among the plurality of operating systems by the input device, acquiring a target entering key of a specified operating system; and after copying the data information to the specified operating system, encrypting the data information in the arbitrary operating system by using the target entering key of the specified operating system, or not displaying the data information in the arbitrary operating system again.

In the above technical solution, preferably, by invoking the operation instructions stored in the memory, the processor is further used for executing the following operations: prompting a user of the terminal to input an entering key of the specified operating system by the output device after acquiring the target entering key of the specified operating system; judging whether the received entering key input by the user from the input device is matched with the target entering key or not; when judging that the entering key input by the user is matched with the target entering key, permitting copying the data information to the specified operating system, otherwise, forbidding copying the data information to the specified operating system.

In the above technical solution, preferably, encrypting the data information in the arbitrary operating system by using the target entering key of the specified operating system specifically comprises: generating a security packet in the arbitrary operating system; moving the data information in the arbitrary operating system to the security packet; and encrypting the security packet by using the target entering key.

In the above technical solution, preferably, by invoking the operation instructions stored in the memory, the processor is further used for executing the following operations: prompting the user to input an entering key of the security packet by the output device upon receiving a command of entering the security packet by the input device; judging whether the received entering key input by the user from the input device is matched with the target entering key or not; when judging that the entering key input by the user is matched with the target entering key, permitting entering the security packet, otherwise, forbidding entering the security packet.

In the above technical solution, preferably, the specified operating system is an operating system with the highest security level among the plurality of operating systems.

According to another aspect of the present disclosure, further provided is a nonvolatile machine-readable medium, in which a program product used for processing information in a terminal is stored, wherein the terminal comprises a plurality of operating systems, and wherein the program product includes an executable instruction used for driving a computer system to execute the following steps: acquiring a target entering key of a specified operating system upon receiving an instruction of copying data information in an arbitrary operating system to the specified operating system among the plurality of operating systems; and after copying the data information to the specified operating system, encrypting the data information in the arbitrary operating system by using the target entering key of the specified operating system, or not displaying the data information in the arbitrary operating system again.

In the above technical solution, preferably, the program product further includes an executable instruction used for driving the computer system to execute the following steps: prompting a user of the terminal to input an entering key of the specified operating system after acquiring the target entering key of the specified operating system; judging whether the received entering key input by the user is matched with the target entering key or not; when judging that the entering key input by the user is matched with the target entering key, permitting copying the data information to the specified operating system, otherwise, forbidding copying the data information to the specified operating system.

In the above technical solution, preferably, encrypting the data information in the arbitrary operating system by using the target entering key of the specified operating system specifically comprises: generating a security packet in the arbitrary operating system; moving the data information in the arbitrary operating system to the security packet; and encrypting the security packet by using the target entering key.

In the above technical solution, preferably, the program product further includes an executable instruction used for driving the computer system to execute the following steps: prompting the user to input an entering key of the security packet upon receiving a command of entering the security packet; judging whether the received entering key input by the user is matched with the target entering key or not; when judging that the entering key input by the user is matched with the target entering key, permitting entering the security packet, otherwise, forbidding entering the security packet.

In the above technical solution, preferably, the specified operating system is an operating system with the highest security level among the plurality of operating systems.

Through the above technical solution, after the data information is copied from the arbitrary operating system to the specified operating system, the data information in the arbitrary operating system can be encrypted by adopting the entering key of the specified operating system, or the data information is not displayed in the arbitrary operating system, that is, the data information is stored in the arbitrary operating system, but is concealed, thereby guaranteeing that the data are not lost and the data stored in the security operating system are not easy to divulge.

DETAILED DESCRIPTION OF THE EMBODIMENTS

In order to understand the above objectives, features and advantages of the present disclosure more clearly, the present disclosure will be further described in detail below in combination with the accompanying drawings and specific embodiments. It should be noted that the embodiments of the present disclosure and the features in the embodiments can be combined with one another without conflicts.

Many specific details are illustrated in the following description for sufficiently understanding the present disclosure. However, the present disclosure may also be implemented by adopting other modes different from these described herein. Hence, the protection scope of the present disclosure is not limited by the specific embodiments disclosed below.

Figure 1:
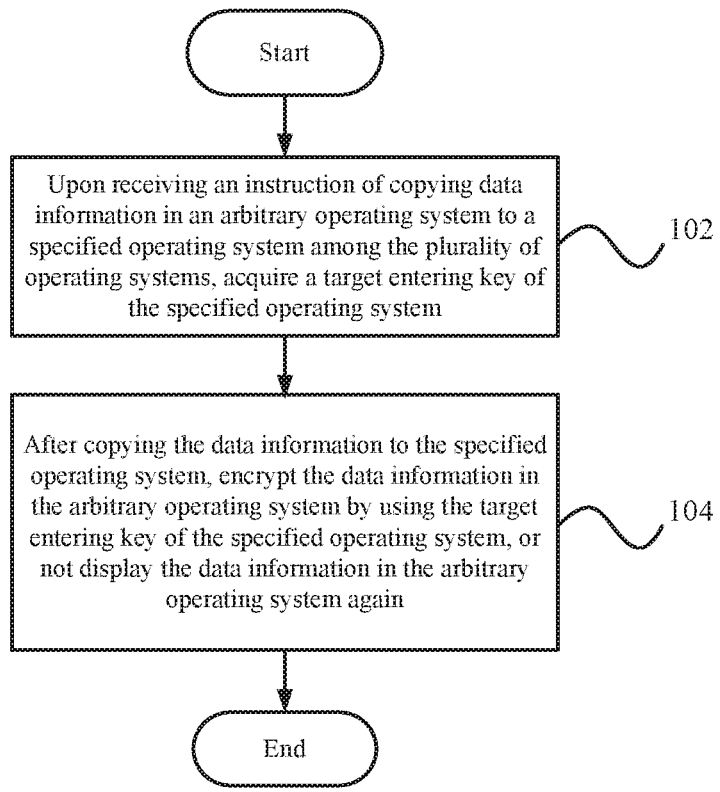
FIG. 1 shows a flow chart of an information processing method according to an embodiment of the present disclosure.

FIG. 1 shows a flow chart of an information processing method according to an embodiment of the present disclosure.

As shown in FIG. 1, the information processing method according to the embodiment of the present disclosure is applied to a terminal that includes a plurality of operating systems, and includes: step 102, upon receiving an instruction of copying data information in an arbitrary operating system to a specified operating system among the plurality of operating systems, acquiring a target entering key of the specified operating system; and step 104, after copying the data information to the specified operating system, encrypting the data information in the arbitrary operating system by using the target entering key of the specified operating system, or not displaying the data information in the arbitrary operating system again.

In the technical solution, after the data information is copied from the arbitrary operating system to the specified operating system, the data information in the arbitrary operating system can be encrypted by adopting the entering key of the specified operating system, or the data information is not displayed in the arbitrary operating system, that is, the data information is stored in the arbitrary operating system, but is concealed. The arbitrary operating system may be a common operating system while specified operating system be a security operating system, in this case, after the data are copied from the common operating system to the security operating system, the data information is encrypted by using the entering key of the security operating system, or is stored in the common system but not displayed again, thereby guaranteeing that the data can be exported from the common operating system when the terminal is damaged to avoid data loss, and also guaranteeing that the data stored in the security operating system are not easy to divulge.

The data information includes but is not limited to contact information, notebook information, call records and the like.

In the above technical solution, preferably, the method further includes: prompting a user of the terminal to input an entering key of the specified operating system after acquiring the target entering key of the specified operating system; judging whether the received entering key input by the user is matched with the target entering key or not; when judging that the entering key input by the user is matched with the target entering key, permitting copying the data information to the specified operating system, otherwise, forbidding copying the data information to the specified operating system.

In the technical solution, after receiving the copying command and acquiring the entering key of the specified operating system, the terminal prompts the user to input the entering key of the specified operating system and judges whether the key input by the user is correct or not, the data information is copied to the specified operating system when the user inputs the correct key, and the copying operation is forbidden when the key input by the user is incorrect, and then only the user who knows the entering key of the specified operating system can carry out the copying operation, thereby guaranteeing the security in the specified operating system and preventing unsecure data from maliciously disrupting the specified operating system.

In the above technical solution, preferably, encrypting the data information in the arbitrary operating system by using the target entering key of the specified operating system specifically includes: generating a security packet in the arbitrary operating system; moving the data information in the arbitrary operating system to the security packet; and encrypting the security packet by using the target entering key.

In the technical solution, after the data information in the arbitrary operating system is copied to the specified operating system, a security packet is generated in the arbitrary operating system, the data information copied just is put into the security packet, and the security packet is encrypted by using the security key of the specified operating system, so that the data information copied to the specified operating system is not easily viewed by others, and the data security and the user privacy are guaranteed.

In the above technical solution, preferably, the method further includes: prompting the user to input an entering key of the security packet upon receiving a command of entering the security packet; judging whether the received entering key input by the user is matched with the target entering key or not; when judging that the entering key input by the user is matched with the target entering key, permitting entering the security packet, otherwise, forbidding entering the security packet.

In the technical solution, if the user wants to view the data information in the security packet, the user must input the same entering key as the specified operating system; as long as the user inputs the correct entering key, the user is permitted to view the data in the security packet, thereby guaranteeing the data security and the user privacy.

In the above technical solution, preferably, the specified operating system is an operating system with the highest security level among the plurality of operating systems.

In the technical solution, the specified operating system includes but is not limited to the operating system with the highest security level, namely a security system.

Figure 2:
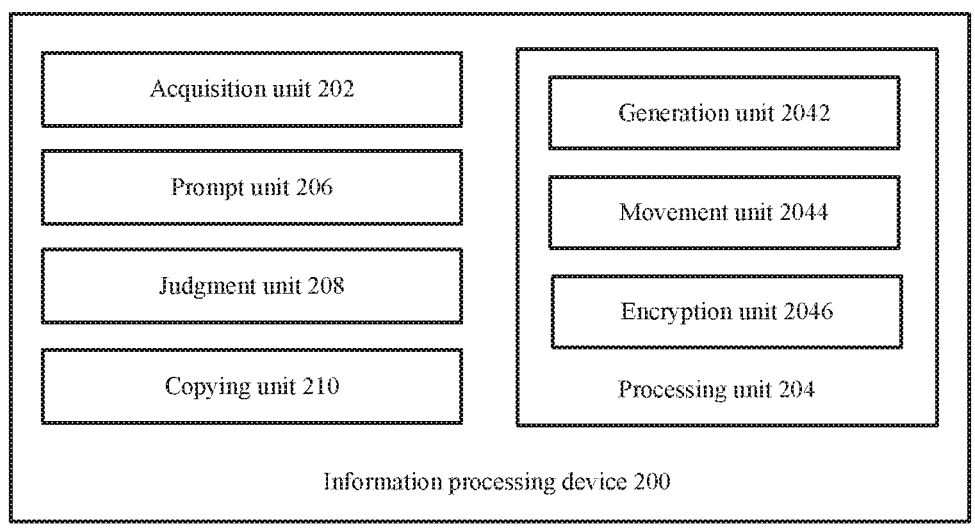
FIG. 2 shows a block diagram of an information processing device according to an embodiment of the present disclosure.

FIG. 2 shows a block diagram of an information processing device according to an embodiment of the present disclosure.

As shown in FIG. 2, the information processing device 200 according to the embodiment of the present disclosure is applied to a terminal that includes a plurality of operating systems. The information processing device 200 includes: an acquisition unit 202, configured to acquire a target entering key of the specified operating system upon receiving an instruction of copying data information in an arbitrary operating system to a specified operating system among the plurality of operating systems; and a processing unit 204, configured to, after copying the data information to the specified operating system, encrypt the data information in the arbitrary operating system by using the target entering key of the specified operating system, or not display the data information in the arbitrary operating system again.

In the technical solution, after the data information is copied from the arbitrary operating system to the specified operating system, the data information in the arbitrary operating system can be encrypted by adopting the entering key of the specified operating system, or the data information is not displayed in the arbitrary operating system, that is, the data information is stored in the arbitrary operating system, but is concealed. The arbitrary operating system may be a common operating system, the specified operating system may be a security operating system, in this case, after the data are copied from the common operating system to the security operating system, the data information is encrypted by using the entering key of the security operating system, or is stored in the common system but not displayed again, thereby guaranteeing that the data can be exported from the common operating system when the terminal is damaged to avoid data loss, and also guaranteeing that the data stored in the security operating system are not easy to divulge.

In the above technical solution, preferably, the device further includes: a prompt unit 206, configured to prompt a user of the terminal to input an entering key of the specified operating system after acquiring the target entering key of the specified operating system; a judgment unit 208, configured to judge whether the received entering key input by the user is matched with the target entering key or not; and a copying unit 210, configured to, when judging that the entering key input by the user is matched with the target entering key, permit copying the data information to the specified operating system, otherwise, forbid copying the data information to the specified operating system.

In the technical solution, after receiving the copying command and acquiring the entering key of the specified operating system, the terminal prompts the user to input the entering key of the specified operating system and judges whether the key input by the user is correct or not, the data information is copied to the specified operating system when the user inputs the correct key, and the copying operation is forbidden when the key input by the user is incorrect, and then only the user who knows the entering key of the specified operating system can carry out the copying operation, thereby guaranteeing the security in the specified operating system and preventing unsecure data from maliciously disrupting the specified operating system.

In the above technical solution, preferably, the processing unit 204 includes: a generation unit 2042, configured to generate a security packet in the arbitrary operating system; a movement unit 2044, configured to move the data information in the arbitrary operating system to the security packet; and an encryption unit 2046, configured to encrypt the security packet by using the target entering key.

In the technical solution, after the data information in the arbitrary operating system is copied to the specified operating system, a security packet is generated in the arbitrary operating system, the data information copied just is put into the security packet, and the security packet is encrypted by using the security key of the specified operating system, so that the data information copied to the specified operating system is not easily viewed by others, and the data security and the user privacy are guaranteed.

In the above technical solution, preferably, the prompt unit 206 is further configured to: prompt the user to input an entering key of the security packet upon receiving a command of entering the security packet; the judgment unit 208 is further configured to: judge whether the received entering key input by the user is matched with the target entering key or not; the processing unit 204 is further configured to: when judging that the entering key input by the user is matched with the target entering key, permit entering the security packet, otherwise, forbid entering the security packet.

In the technical solution, if the user wants to view the data information in the security packet, the user must input the same entering key as the specified operating system; as long as the user inputs the correct entering key, the user is permitted to view the data in the security packet, thereby guaranteeing the data security and the user privacy.

In the above technical solution, preferably, the specified operating system is an operating system with the highest security level among the plurality of operating systems.

In the technical solution, the specified operating system includes but is not limited to the operating system with the highest security level, namely a security system.

Through the above technical solution, after the data information is copied from the arbitrary operating system to the specified operating system, the data information in the arbitrary operating system can be encrypted by adopting the entering key of the specified operating system, or the data information is not displayed in the arbitrary operating system, that is, the data information is stored in the arbitrary operating system, but is concealed, thereby guaranteeing that the data are not lost and the data stored in the security operating system are not easy to divulge.

The technical solution of the present disclosure will be described in detail below, taking the arbitrary operating system being a common operating system, the specified operating system being a security specified operating system and the data information being contact information as an example.

Figure 3:
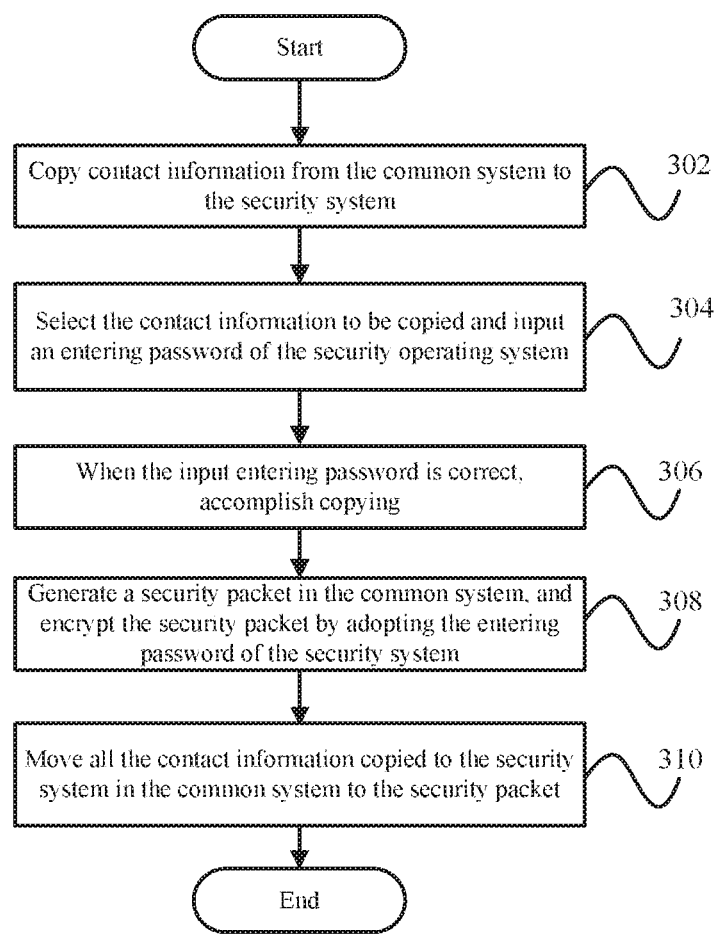
FIG. 3 shows a specific flow chart of the information processing method according to one embodiment of the present disclosure.

FIG. 3 shows a specific flow chart of the information processing method according to one embodiment of the present disclosure.

As shown in FIG. 3, the specific flow of the information processing method according to one embodiment of the present disclosure includes:

step 302, copying contact information from the common system to the security system;

step 304, selecting the contact information to be copied and inputting an entering password of the security operating system;

step 306, when the input entering password is correct, accomplishing copying;

step 308, generating a security packet in the common system, and encrypting the security packet by adopting the entering password of the security system, wherein when the terminal carries out copying for the first time, the security packet can be generated, and when the copying is not first one, that is, when the security packet is present, this step can be omitted, and step 310 is directly carried out; and step 310, moving all the contact information copied to the security system in the common system to the security packet, wherein if the information in the security packet needs to be viewed, it needs to input the same entering password as the security system.

Figure 4:
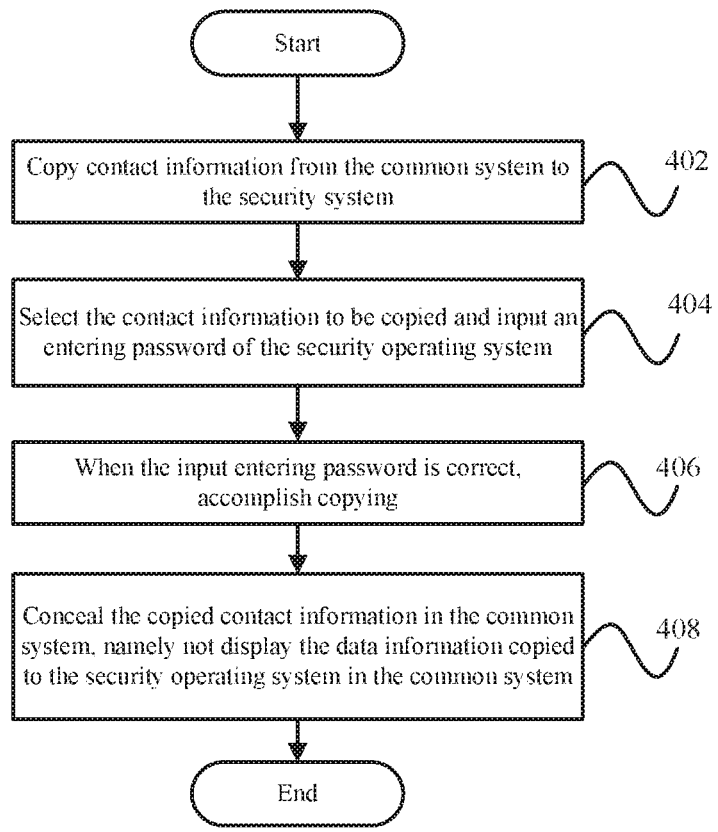
FIG. 4 shows a specific flow chart of the information processing method according to another embodiment of the present disclosure.

As shown in FIG. 4, the specific flow of the information processing method according to another embodiment of the present disclosure includes:

step 402, copying contact information from the common system to the security system;

step 404, selecting the contact information to be copied and inputting an entering password of the security operating system;

step 406, when the input entering password is correct, accomplishing copying; and step 408, concealing the copied contact information in the common system, namely not displaying the data information copied to the security operating system in the common system. The data information is only concealed, so when the terminal is damaged, the data information is not lost, and meanwhile, the security of the data information is also guaranteed.

Figure 5:
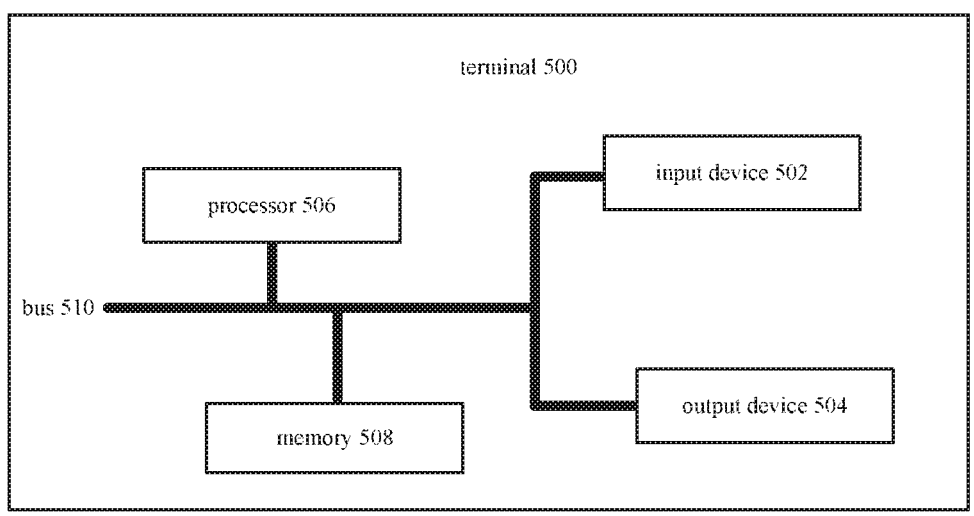
FIG. 5 shows a block diagram of a terminal comprising a plurality of operation systems according to an embodiment of the present disclosure.

FIG. 5 shows a block diagram of a terminal comprising a plurality of operation systems according to an embodiment of the present disclosure.

As shown in FIG. 5, the terminal 500 according to the embodiment of the present disclosure includes: an input device 502, an output device 504, a processor 506 and a memory 508 (wherein, one or more processors can be arranged in the terminal 500, and one processor 506 is taken as an example in FIG. 5). In some embodiments of the present disclosure, the input device 502, the output device 504, the processor 506 and the memory 508 can be connected by buses or in other manners, and bus connection 510 is taken as an example in FIG. 5; wherein by invoking operation instructions stored in the memory 508, the processor 506 is used for executing the following operations: upon receiving an instruction of copying data information in an arbitrary operating system to a specified operating system among the plurality of operating systems by the input device 502, acquiring a target entering key of the specified operating system; and after copying the data information to the specified operating system, encrypting the data information in the arbitrary operating system by using the target entering key of the specified operating system, or not displaying the data information in the arbitrary operating system again.

In the technical solution, after the data information is copied from the arbitrary operating system to the specified operating system, the data information in the arbitrary operating system can be encrypted by adopting the entering key of the specified operating system, or the data information is not displayed in the arbitrary operating system, that is, the data information is stored in the arbitrary operating system, but is concealed. The arbitrary operating system may be a common operating system while the specified operating system be a security operating system. thus, after the data being copied from the common operating system to the security operating system, the data information is encrypted by using the entering key of the security operating system, or is stored in the common system but not displayed again, thereby guaranteeing that the data can be exported from the common operating system when the terminal is damaged to avoid data loss, and also guaranteeing that the data stored in the security operating system are not easy to divulge.

The data information includes but is not limited to contact information, notebook information, call records.

In the above technical solution, preferably, the processor 506 invokes the operation instructions stored in the memory 508 to further execute the following operations: after acquiring the target entering key of the specified operating system, prompting a user of the terminal to input an entering key of the specified operating system by the output device 504; judging whether the received entering key input by the user from the input device 502 is matched with the target entering key or not; when judging that the entering key input by the user is matched with the target entering key, permitting copying the data information to the specified operating system, otherwise, forbidding copying the data information to the specified operating system.

In the technical solution, after receiving the copying command and acquiring the entering key of the specified operating system, the terminal prompts the user to input the entering key of the specified operating system and judges whether the key input by the user is correct or not. The data information is copied to the specified operating system when the user inputs the correct key, and the copying operation is forbidden when the key input by the user is incorrect. Thus, only the user who knows the entering key of the specified operating system can carry out the copying operation, thereby guaranteeing the security in the specified operating system and preventing unsecure data from maliciously disrupting the specified operating system.

In the above technical solution, preferably, encrypting the data information in the arbitrary operating system by using the target entering key of the specified operating system specifically includes: generating a security packet in the arbitrary operating system; moving the data information in the arbitrary operating system to the security packet; and encrypting the security packet by using the target entering key.

In the technical solution, after the data information in the arbitrary operating system is copied to the specified operating system, a security packet is generated in the arbitrary operating system, the data information copied just is put into the security packet, and the security packet is encrypted by using the security key of the specified operating system, so that the data information copied to the specified operating system is not easily viewed by others, and the data security and the user privacy are guaranteed.

In the above technical solution, preferably, the processor 506 invokes the operation instructions stored in the memory 508 to further execute the following operations: upon receiving a command of entering the security packet by the input device 502, prompting the user to input an entering key of the security packet by the output device 504; judging whether the received entering key input by the user from the input device is matched with the target entering key or not; when judging that the entering key input by the user is matched with the target entering key, permitting entering the security packet, otherwise, forbidding entering the security packet.

In the technical solution, if the user wants to view the data information in the security packet, the user must input the same entering key as the specified operating system; as long as the user inputs the correct entering key, the user is permitted to view the data in the security packet, thereby guaranteeing the data security and the user privacy.

In the above technical solution, preferably, the specified operating system is an operating system with the highest security level among the plurality of operating systems.

In the technical solution, the specified operating system includes but is not limited to the operating system with the highest security level, namely a security system.

According to the embodiments of the present disclosure, a nonvolatile machine-readable medium is further provided, in which a program product used for processing information in a terminal is stored, wherein the terminal comprises a plurality of operating systems, and wherein the program product includes an executable instruction used for driving a computer system to execute the following steps: acquiring a target entering key of a specified operating system upon receiving an instruction of copying data information in an arbitrary operating system to the specified operating system among the plurality of operating systems; and after copying the data information to the specified operating system, encrypting the data information in the arbitrary operating system by using the target entering key of the specified operating system, or not displaying the data information in the arbitrary operating system again.

In the technical solution, after the data information is copied from the arbitrary operating system to the specified operating system, the data information in the arbitrary operating system can be encrypted by adopting the entering key of the specified operating system, or the data information is not displayed in the arbitrary operating system, that is, the data information is stored in the arbitrary operating system, but is concealed. The arbitrary operating system may be a common operating system while the specified operating system be a security operating system. thus, after the data being copied from the common operating system to the security operating system, the data information is encrypted by using the entering key of the security operating system, or is stored in the common system but not displayed again, thereby guaranteeing that the data can be exported from the common operating system when the terminal is damaged to avoid data loss, and also guaranteeing that the data stored in the security operating system are not easy to divulge.

The data information includes but is not limited to contact information, notebook information, call records.

In the above technical solution, preferably, the program product further includes an executable instruction used for driving the computer system to execute the following steps: prompting a user of the terminal to input an entering key of the specified operating system after acquiring the target entering key of the specified operating system; judging whether the received entering key input by the user is matched with the target entering key or not; when judging that the entering key input by the user is matched with the target entering key, permitting copying the data information to the specified operating system, otherwise, forbidding copying the data information to the specified operating system.

In the technical solution, after receiving the copying command and acquiring the entering key of the specified operating system, the terminal prompts the user to input the entering key of the specified operating system and judges whether the key input by the user is correct or not. The data information is copied to the specified operating system when the user inputs the correct key, and the copying operation is forbidden when the key input by the user is incorrect. Thus, only the user who knows the entering key of the specified operating system can carry out the copying operation, thereby guaranteeing the security in the specified operating system and preventing unsecure data from maliciously disrupting the specified operating system.

In the above technical solution, preferably, encrypting the data information in the arbitrary operating system by using the target entering key of the specified operating system specifically comprises: generating a security packet in the arbitrary operating system; moving the data information in the arbitrary operating system to the security packet; and encrypting the security packet by using the target entering key.

In the technical solution, after the data information in the arbitrary operating system is copied to the specified operating system, a security packet is generated in the arbitrary operating system, the data information copied just is put into the security packet, and the security packet is encrypted by using the security key of the specified operating system, so that the data information copied to the specified operating system is not easily viewed by others, and the data security and the user privacy are guaranteed.

In the above technical solution, preferably, the program product further includes an executable instruction used for driving the computer system to execute the following steps: prompting the user to input an entering key of the security packet upon receiving a command of entering the security packet; judging whether the received entering key input by the user is matched with the target entering key or not; when judging that the entering key input by the user is matched with the target entering key, permitting entering the security packet, otherwise, forbidding entering the security packet.

In the technical solution, if the user wants to view the data information in the security packet, the user must input the same entering key as the specified operating system; as long as the user inputs the correct entering key, the user is permitted to view the data in the security packet, thereby guaranteeing the data security and the user privacy.

In the above technical solution, preferably, the specified operating system is an operating system with the highest security level among the plurality of operating systems.

In the technical solution, the specified operating system includes but is not limited to the operating system with the highest security level, namely a security system.

The technical solution of the present disclosure is described in detail above in combination with the accompanying drawings. Through the technical solution of the present disclosure, after the data information is copied from the arbitrary operating system to the specified operating system, the data information in the arbitrary operating system can be encrypted by adopting the entering key of the specified operating system, or the data information is not displayed in the arbitrary operating system, that is, the data information is stored in the arbitrary operating system, but is concealed, thereby guaranteeing that the data are not lost when the terminal is damaged and the data stored in the security operating system are not easy to divulge.

The foregoing descriptions are merely preferred embodiments of the present disclosure, but are not used for limiting the present disclosure. Various modifications and variations may be made to the present disclosure for those skilled in the art. Any modification, equivalent substitution, improvement and the like made within the spirit and principle of the present disclosure shall fall into the protection scope of the present disclosure.

The invention claimed is:

1. An information processing method, applied to a terminal that comprises a plurality of operating systems including a first operating system and a second operating system different from the first operating system, comprising:
   receiving an instruction to copy data information from the second operating system to the first operating system;
   prompting a user of the terminal to input a key after receiving the instruction;
   comparing the inputted key with an encryption key associated with the first operating system to determine whether the inputted key matches the encryption key associated with the first operating system;
   copying the data information to the first operating system based on the comparing; and
   after copying the data information to the first operating system, encrypting the data information in the second operating system by using the encryption key associated with the first operating system, or not displaying the data information in the second operating system again even though the data information is stored within the second operating system.

2. The information processing method according to claim 1,
   wherein when the key input by the user matches with the encryption key associated with the first operating system, permitting copying the data information to the first operating system, otherwise, forbidding copying the data information to the first operating system.

3. The information processing method according to claim 2, wherein encrypting the data information in the second operating system by using the encryption key associated with the first operating system comprises:
   generating a security packet in the second operating system;
   moving the data information in the second operating system to the security packet; and
   encrypting the security packet by using the encryption key associated with the first operating system.

4. The information processing method according to claim 3, further comprising:
   prompting the user to input another key upon receiving a command of entering the security packet;
   judging whether the received another key input by the user is matched with the encryption key associated with the first operating system or not;
   when judging that the another key input by the user is matched with the encryption key associated with the first operating system, permitting entering the security packet, otherwise, forbidding entering the security packet.

5. The information processing method according to claim 1, wherein the first operating system is an operating system with the highest security level among the plurality of operating systems.

6. The information processing method according to claim 1, wherein the first operating system and the second operating system have different levels of security.

7. The information processing method according to claim 2, wherein the first operating system is an operating system with the highest security level among the plurality of operating systems.

8. The information processing method according to claim 3, wherein the first operating system is an operating system with the highest security level among the plurality of operating systems.

9. A terminal which comprises a plurality of operating systems including a first operating system and a second operating system different from the first operating system, comprising:
an input device,
an output device,
a processor and a memory, wherein by invoking operation instructions stored in the memory, the processor is configured:
receive an instruction to copy data information from the second operating system to the first operating system via the input device;
prompt a user of the terminal to input a key after receiving the instruction;
compare the inputted key with an encryption key associated with the first operating system to determine whether the inputted key matches the encryption key associated with the first operating system;
copy the data information to the first operating system based on the comparing; and
after copying the data information to the first operating system, the processor is further configured to encrypt the data information in the second operating system by using the encryption key associated with the first operating system, or not display the data information in the second operating system again even though the data information is stored within the second operating system.

10. The terminal according to claim 9,
wherein when the key input by the user matches with the encryption key associated with the first operating system, permitting copying the data information to the first operating system, otherwise, forbidding copying the data information to the first operating system.

11. The terminal according to claim 10, wherein encrypting the data information in the second operating system by using the encryption key associated with the first operating system comprises:
generating a security packet in the second operating system;
moving the data information in the second operating system to the security packet; and
encrypting the security packet by using the encryption key associated with the first operating system.

12. The terminal according to claim 11, wherein by invoking the operation instructions stored in the memory, the processor is further configured to:
upon receiving a command of entering the security packet by the input device, prompt the user to input another key by the output device;
judge whether the received another key input by the user from the input device is matched with the encryption key associated with the first operating system or not;
when judging that the another key input by the user is matched with the encryption key associated with the first operating system, permitting entering the security packet, otherwise, forbidding entering the security packet.

13. The terminal according to claim 9, wherein the first operating system is an operating system with the highest security level among the plurality of operating systems.

14. The terminal according to claim 10, wherein the first operating system is an operating system with the highest security level among the plurality of operating systems.

15. The terminal according to claim 11, wherein the first operating system is an operating system with the highest security level among the plurality of operating systems.

16. A nonvolatile machine-readable medium, in which a program product used for processing information in a terminal is stored, wherein the terminal comprises a plurality of operating systems including a first operating system and a second operating system different from the first operating system, and wherein the program product includes an executable instruction used for driving a computer system to execute:
receiving an instruction to copy data information from the second operating system to the first operating system;
prompting a user of the terminal to input a key after receiving the instruction;
comparing the inputted key with an encryption key associated with the first operating system to determine whether the inputted key matches the encryption key associated with the first operating system;
copying the data information to the first operating system based on the comparing; and
after copying the data information to the first operating system, encrypting the data information in the second operating system by using the encryption key associated with the first operating system, or not displaying the data information in the second operating system again even though the data information is stored within the second operating system.

17. The nonvolatile machine-readable medium according to claim 16,
wherein when the key input by the user matches with the encryption key associated with the first operating system, permitting copying the data information to the first operating system, otherwise, forbidding copying the data information to the first operating system.

18. The nonvolatile machine-readable medium according to claim 17, wherein encrypting the data information in the second operating system by using the encryption key associated with the first operating system specifically comprises:
generating a security packet in the arbitrary operating system;
moving the data information in the second operating system to the security packet; and
encrypting the security packet by using the encryption key associated with the first operating system.

19. The nonvolatile machine-readable medium according to claim 18, wherein the program product further includes an executable instruction used for driving the computer system to execute:
prompting the user to input another key upon receiving a command of entering the security packet;

judging whether the received another key input by the user is matched with the encryption key associated with the first operating system or not;

when judging that the another key input by the user is matched with the encryption key associated with the first operating system, permitting entering the security packet, otherwise, forbidding entering the security packet.

20. The nonvolatile machine-readable medium according to claim 16, wherein the first operating system is an operating system with the highest security level among the plurality of operating systems.

* * * * *